United States Patent
Foster et al.

[15] 3,668,202

[45] June 6, 1972

[54] PROCESS FOR PREPARING CEPHAM COMPOUNDS

[72] Inventors: Bennie J. Foster, Greenwood; Gerald E. Gutowski; Lowell D. Hatfield, both of Indianapolis, all of Ind.

[73] Assignee: Eli Lilly and Company, Indianapolis, Ind.

[22] Filed: Feb. 24, 1970

[21] Appl. No.: 13,815

[52] U.S. Cl. .....................260/243 C, 424/246, 260/239.1
[51] Int. Cl. ...................................C07d 99/24, C07d 99/14
[58] Field of Search ..............................260/243 C

[56] References Cited

UNITED STATES PATENTS 3,275,626   9/1966   Morin et al..........................260/243 C
3,507,861   4/1970   Morin et al..........................260/243 C

*Primary Examiner*—Nicholas S. Rizzo
*Attorney*—Everet F. Smith and John T. Reynolds

[57] ABSTRACT

Preparing a 3-hydroxy-3-methyl-cepham-4-carboxylic acid, salt or ester in improved yields by heating a penicillin sulfoxide acid, salt, or ester in the presence of sulfuric or sulfamic acid, or a salt or ester thereof in a solvent system containing a tertiary carboxamide.

10 Claims, No Drawings

PROCESS FOR PREPARING CEPHAM COMPOUNDS

INTRODUCTION

This invention relates to the production of cephalosporin compounds which are useful as intermediates in the production of known and new cephalosporin type antibiotics. More particularly, this invention provides an improved process for preparing 3-hydroxy-3-methyl-cepham-4-carboxylic acid, salts and esters from the corresponding penicillin sulfoxides.

BACKGROUND OF THE INVENTION

The semi-synthetic production of 7-acylamidodesacetoxycephalosporin antibiotics from penicillin starting materials has become of importance recently, due to the process invention of Morin and Jackson (U.S. Pat. No. 3,275,626) who describe and claim a process for converting penicillin sulfoxide esters to desacetoxycephalosporanic acid esters and to the improvements on that Morin-Jackson process by Chauvette and Flynn who found that certain esters of the penicillin starting materials and of the resulting desacetoxycephalosporin ester products were more useful in the process in that they were more easily cleaved than those employed by Morin and Jackson. Further improvements of the Morin-Jackson process were claimed by Robin D. G. Cooper in application Ser. No. 838,697, filed July 2, 1969 who found that the use of certain tertiary carboxamide, urea, or sulfonamide solvents directed the heat rearrangement of the penicillin sulfoxide esters more specifically toward production of the corresponding desacetoxycephalosporin esters. Some of the 7-acylamidodesacetoxycephalosporanic acid compounds have been found to have unique properties as antibiotics in their own right. For example, cephalexin, 7-[D-alpha-amino-phenylacetamido]-3-methyl-Δ³-cephem-4-carboxylic acids zwitterion, and pharmaceutically acceptable cationic and anionic salt forms thereof, are useful as oral antibiotics in combatting infections caused, e.g., by penicillin resistant strains of *Staphylococcus aureus*, and many other Gram positive and Gram negative micro-organisms.

One of the unique advantages of Δ³-desacetoxycephalosporin compounds, that is, compounds of the general formula

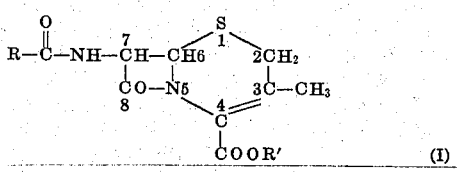

wherein R is the residue of the acylamido group in the 7-position, and R' is hydrogen, a salt forming cation, an ester group, or an anionic charge when the COO— forms a salt with a cation either within or outside of the molecule, is that such compounds can now be prepared from penicillin sulfoxide esters by the Morin-Jackson process, especially as improved by the Chauvette-Flynn and R.D.G. Cooper improvements.

Lowell D. Hatfield in application Ser. No. 799,504, filed Feb. 14, 1969 now U.S. Pat. No. 3,591,585 has disclosed his invention for an improved process for the direct preparation of a desacetoxycephalosporin ester by the patented Morin-Jackson process as improved by the Cooper solvent systems. Hatfield discovered that by using a combination of a sulfonic acid and a water removal means during the step of heating the penicillin sulfoxide ester starting material, higher yields of the desired desacetoxycephalosporin esters were obtained. However, small yields of previously unidentified residues were also prepared. One of the inventors herein, G. E. Gutowski, has discovered and claimed in a copending application, Ser. No. 13,814 filed Feb. 24, 1970, certain new 3-hydroxy-3-methyl-cepham-4-carboxylic acids and esters which he has identified and characterized. It is now known that these new cepham compounds were prepared in small yields under the above mentioned Hatfield process conditions. When various other acids are used mixtures of products have been obtained.

It is an object of this invention to provide an improved process for preparing 3-hydroxy-3-methyl-cepham-4-carboxylic acids and esters.

It is a more specific object of this invention to define process conditions which will enable those skilled in the art to prepare 3-hydroxy-3-methylcepham acids, salts, and esters from penicillin sulfoxide acids, salts, and esters in higher yields than has previously been possible.

SUMMARY OF THE INVENTION

Briefly, according to this invention we have discovered that 3-hydroxy-3-methylcepham-4-carboxylic acids, and esters can be prepared in high yields by the heat treatment of a corresponding penicillin sulfoxide acid or ester in the presence of a sulfuric or sulfamic acid or a salt or ester of such an acid in a tertiary carboxamide containing solvent, at a temperature of from about 80° C. to about 150° C. for a time sufficient to form the 3-hydroxy-3-methylcepham-4-carboxylic acid or ester.

DETAILED DESCRIPTION OF THE INVENTION

This invention provides a new process for preparing 3-hydroxy-3-methylcepham-4-carboxylic acid and ester compounds from the corresponding penicillin sulfoxide acid or ester. These products of the process can be described by the formula

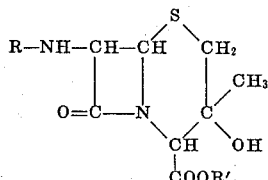

where R is hydrogen, $H_2^{\oplus}$, or an amino protecting group, preferably an acyl group derived from the penicillin sulfoxide starting material from which it can be made, and R' is hydrogen, an ester group, a salt forming cation, or an anionic charge when R is $H_2^{\oplus}$. For convenience, as indicated above these compounds can be referred to generally as 3-hydroxy-3-methylcepham acids, esters, salts, and zwitterions. The term "-cepham" has been defined in the *J. Am. Chem. Soc.*, 84, p. 3,400 (1962) as meaning the ring structure

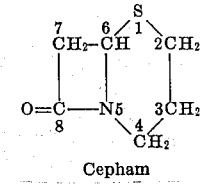

Cepham as an adaptation from the corresponding term "penam," defined in *J. Amer. Chem. Soc.*, 75, p. 3,293, footnote 2 (1953) used to name various penicillins and meaning the ring structure

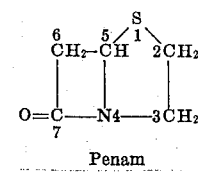

Penam

An example of a product of the process of this invention named by this nomenclature system is 2,2,2-trichloroethyl 3-hydroxy-3-methyl-7-phenoxyacetamido-cepham-4-carboxylate, which can be prepared by heating the penicillin V sulfoxide ester, 2,2,2-trichloroethyl, 2,2-dimethyl-6-phenoxyacetamidopenam-3-carboxylate-1-oxide, under the conditions set forth herewith. These 3-hydroxy-3-methylcepham-4-carboxylic acid and ester compounds are useful as intermediates for the preparation of known and new 3-cephem desacetoxycephalosporin antibiotics, e.g., cephalexin, a known antibiotic, by procedures described hereinbelow. The 3-cephem compounds are related to the cepham compounds in the bicyclic ring structure with the exception that the former have a carbon to carbon double bond between the carbon atoms in the 3 and 4 positions of the dihydrothiazine ring moiety of the structure. Thus, for example, cephalexin, mentioned above can be named 3-methyl-7-(D-α-aminophenylacetamido)-3-cephem-4-carboxylic acid.

According to the process of this invention the penicillin sulfoxide acid, salt or ester is heated in the presence of sulfuric acid, sulfamic acid, or a salt or ester thereof to a temperature of from about 80° C. to about 150° C. dissolved in a solvent medium containing at least about 10 percent by volume of a tertiary carboxamide until an optimum yield of the 3-hydroxy-3-methylcepham-4-carboxylic acid or ester is formed. Generally, the reaction is completed within about 24 hours. With preferred solvents and reactants we have obtained good yields of product after heating the mixture for from 5 to 14 hours. Under the conditions we prefer to use, the penicillin sulfoxide acid or ester is dissolved to a concentration of from about 1 to about 20 percent by weight in a solvent mixture containing the tertiary carboxamide and organic inert liquid in the optimum proportions of from about 3:5 to about 5:3 parts of volume of the tertiary carboxamide: organic inert liquid. The proportions of solvent components and concentration of penicillin sulfoxide will vary somewhat, however, with the choice of tertiary carboxamide, any organic inert liquid, and the selected temperature and time of reaction. We have found that with the preferred tertiary carboxamide, N,N-dimethylacetamide (DMA), as the proportion of the organic inert liquid cosolvent is varied from the proportions given above, the yield and nature of the reaction mixture is changed.

Any prior art penicillin or 6-(n-protected-amino)-2,2-dimethylpenam-3-carboxylic acid compound which is not otherwise converted under the conditions of acidity and elevated temperature employed herein, can be used as a starting material to prepare compounds within the scope of this invention. The penicillin or penam must be oxidized to the sulfoxide state prior to treatment. It can also be esterified to protect the carboxyl group in subsequent reactions, but need not be esterified for preparing the compounds of this invention. Alternatively, the penicillin or penam can be esterified and then oxidized to the penicillin sulfoxide ester. A wide range of penicillin, and penam compounds can be treated to obtain the 3-hydroxy-3-methyl-cepham compounds of this invention. Penicillins sulfoxide salts with alkali metals particularly sodium, potassium, ammonium, and amine salts can also be used but are not necessary.

The amino protection group represented by R in the above formula can be any group known to protect the nitrogen to which it is bonded from attack by the acid during the heating operation. If R is hydrogen, i.e., when the nitrogen in the 7-position is in the free amino state, the yields of the desired product are substantially lower. The R group can be any amino protecting group used to protect amino groups in peptide synthesis chemistry, e.g., triphenylmethyl, butoxycarbonyl, benzyloxycarbonyl, allyloxycarbonyl, cyclopentyloxycarbonyl, or as is most practical and preferred, an acyl group. Many acyl groups suitable for this purpose are already known in the penicillin and cephalosporin antibiotic literature. The preferred amino protecting group is an acyl group of the formula

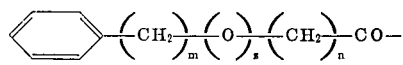

wherein m is an integer of from 0 to 4 inclusive, n is an integer of from 1 to 4 inclusive, z is 0 or 1, and when z is 0, the methylene groups in m and n are connected by a chemical bond, and such acyl groups substituted on phenyl carbon atoms with fluorine, chlorine, bromine, iodine, hydroxy, $C_1$ to $C_3$-alkyl, $C_1$ to $C_2$-alkyloxy, nitro, cyano, or trifluoromethyl groups. The acyl groups can also have methyl groups in place of 1 or 2 of the hydrogens on the carbon atoms in the m or n groups. A few representative examples of such preferred acyl groups include:
  phenylacetyl
  phenoxyacetyl
  phenylheptanoyl
  phenoxyisopropionyl
  benzyloxyacetyl
  phenylpropionyl
  phenylbutyryl
  3-methylphenylbutyryl
  4-propylbenzylacetyl
  benzyloxyacetyl
  phenylethoxypropionyl
  phenylbutoxybutyryl
  3-fluorophenoxyacetyl
  3-hydroxyphenylacetyl
  4-bromophenylpropionyl
  4-iodophenylacetyl
  2-chlorobenzyloxypropionyl
  phenyl-α,α-dimethylacetyl
  4-nitrophenylacetyl
  3-cyanophenylpropionyl
  4-trifluoromethylphenoxyacetyl, and the like.

Numerous other compounds which form amino protecting groups which can be used in the R position are known in the prior art, e.g., those disclosed in the Behrens et al. U.S. Pat. Nos. 2,479,295 to 2,479,297 and 2,562,407 to 2,562,411, and 2,623,876.

The R' symbol in the general formula describing the compounds of this invention can be hydrogen, a water solubilizing salt such as an alkali metal, or quaternary amine, or the residue of an ester. The ester group should be one which is removable by known methods such as by dilute aqueous base or by the use of trifluoroacetic acid, acetic acid and zinc dust, hydrochloric acid and zinc, or the like, or by hydrogenation in the presence of a hydrogenation catalyst such as a palladium, platinum, or rhodium catalyst on a suitable carrier such as carbon, barium sulfate, or alumina so that the cephalosporin compound is not degraded. The preferred ester groups are $C_4$ to $C_6$-tert-alkyl, $C_5$ to $C_7$-tert-alkenyl, $C_5$ to $C_7$-tert-alkynyl such as tert-butyl, tert-pentyl, 1,1-dimethyl-2-propenyl, 1,1-dimethyl-2-pentynyl, 2,2,2-trichloroethyl, benzyl, 3- or 4-methoxybenzyl, 3- or 4-nitrobenzyl, and —$CH_2$—R'' groups where R'' is $C_1$ to $C_4$ alkanoyl, benzoyl, toluoyl, thenoyl, or furoyl as well as benzhydryl, as set forth in the U.S. Pat. No. 3,284,451, or benzhydryl and the like.

Compounds of this invention where R is hydrogen, can be obtained after the penicillin sulfoxide rearrangement reaction has been completed and are formed by subjecting the 3-hydroxy-3-methyl-7-acylamidocepham-4-carboxylic acid or ester to the action of phosphorus pentachloride in the presence of an equivalent amount of a tertiary amine such as pyridine, followed by a lower alkanol, e.g., methanol, and then by water to cleave the 7-acyl group. Examples of such a product are 3-hydroxy-3-methyl-7-aminocepham-4-carboxylic acid and tert-butyl 3-hydroxy-3-methyl-7-aminocepham-4-carboxylate. Such compounds can be recovered from their reaction mixtures by conventional methods, e.g., as a salt with a $C_6$ to $C_{12}$-hydrocarbonsulfonic acid which salt precipitates from most organic solvents. These 7-amino compounds also form inner or zwitterionic salts with the 4-carboxyl group (in which event R' is an anionic charge). In such cases R can represent the $H_2^{\oplus}$ moiety where the second hydrogen is supplied by the carboxyl. Such compounds also form salts with strong acids having a pKa of less than 4 such as hydrochloric, sulfuric, orthophosphoric, nitric, iodic, perchloric acids and the like. If desired 6-aminopenam-3-carboxylic acid such as 6-aminopenicillanic acid (6-APA), and esters thereof such as 2,2,2-trichloroethyl 6-amino-2,2-dimethylpenam-3-carboxylate can be converted by the process of this invention to the corresponding 7-amino 3-hydroxy-3-methylcepham-4-carboxylate acid, or ester, but it is preferred to use a penam in which the amino group is protected as indicated above.

Contrary to the requirements of the above mentioned Hatfield improved process, it is not necessary to remove water from the reaction mixture during the heating operation of this improved process. The tertiary carboxamide may be used as the only solvent system, but for optimum yields it will often be desirable to dilute the tertiary carboxamide with an inert organic liquid. In this process, it is not necessary to choose the inert organic liquid on the basis of whether or not it forms an easily removed azeotrope with water, as was desirable in the Hatfield process. However, those same organic liquids can also be used as diluents for the tertiary carboxamide solvent in this process. Thus, the inert organic liquids can be exemplified by hydrocarbons, especially $C_5$ to $C_8$-alkanes and $C_6$ to $C_8$-aromatic hydrocarbons, halogenated hydrocarbons, particularly those containing from one to six carbon atoms and from one to four chlorine or bromine atoms, as well as ethers, esters, and the like, as set forth in various chemistry handbooks, e.g., *Handbook of Chemistry*, edited by N. A. Lange, Ninth Edition (1956), published by Handbook Publishers, Inc., Sandusky, Ohio, pp. 1,484 to 1,486, and 1,493, and in the Chemical Rubber Co., *Handbook of Chemistry and Physics*, 45th Edition, pp. D-1 to D-18 (1964-65). Examples of suitable diluents include pentane, hexane, heptane, benzene, toluene, xylene, methylene chloride, chloroform, carbon tetrachloride, 1,2-dichloroethane, methyl ethyl ketone, methyl isobutyl ketone, ethyl acetate, isopropyl acetate propylene glycol diacetate, acetonitrile, propionitrile, dioxane, and the like. As indicated above the tertiary carboxamide should constitute at least about 10 percent by volume of the reaction mixture. The diluting organic liquid or liquids forms the remainder of the solvent system.

The general types of tertiary carboxamides which can be used have the structural formula

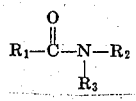

wherein

1. $R_1$ is hydrogen, and each of $R_2$ and $R_3$ is alkyl, phenyl, tolyl, or xylyl such that $R_2$ and $R_3$ together contain up to about 14 carbon atoms;

2. at least one of $R_1$, $R_2$, and $R_3$ is alkyl, and not more than two of $R_1$, $R_2$, and $R_3$ are phenyl, tolyl, xylyl, and $R_1$, $R_2$, and $R_3$ together contain up to about 18 carbon atoms;

3. $R_1$ is hydrogen or alkyl, $R_2$ and $R_3$ are taken together with the nitrogen to which they are bonded to form a saturated monocylic ring which contains from four to six carbon atoms in the ring, which ring can also contain an oxygen ring member, gamma to the ring nitrogen, and $R_1$, $R_2$, and $R_3$ together contain not more than 12 carbon atoms; and/or 4. $R_1$ and $R_2$ are taken together with the amide grouping

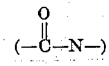

to which they are bonded to form a saturated carbonyl containing monocylic ring having from four to six ring carbon atoms, $R_3$ is alkyl, phenyl, tolyl, or xylyl, and $R_1$, $R_2$, and $R_3$ together contain not more than 14 carbon atoms.

Examples of tertiary carboxamides of the types described above, which may be used in the process include:

1. N,N-dimethylformamide (DMF), N,N-diethylformamide, N,N-diisopropylformamide, N,N-dibutylformamide, N,N-dipentylformamide, N-methyl-N-ethylformamide, N-methyl-N-phenylformamide, N-ethyl-N-(m-tolyl) formamide, N-propyl-N-(3,5-dimethylphenyl) formamide, N,N-diphenylformamide, N,N-bis (4-methylphenyl) formamide, N,(3,5-dimethyl)-N-methylformamide, N,N bis (2,4-dimethylphenyl) formamide, and the like.

2. N,N-dimethylacetamide (DMA), N,N-diethylacetamide, N,N-diisopropylacetamide, N,N-dibutylacetamide, N,N-di-tert-butyl-acetamide, N,N-dimethylpropionamide, N,N-diethylpropionamide, N,N-dipentylpropionamide, N,N-dimethylbutanamide, N,N-diethylbutanamide, N,N-dimethyldecanamide, N,N-dimethylbenzamide, N,N-diethylbenzamide, N,N-dipropyl-m-toluamide, N,N-dibutyl-p-toluamide, N-phenyl-N-methylacetamide, N-(p-tolyl)-N-ethylacetamide, N-(3,5-dimethylphenyl)-N-methylpropionamide, N,N-dimethyl-3,5-dimethylbenzamide, N,N-dibutyl-4-ethylbenzamide, N,N-diphenylacetamide, N-(3-methylphenyl)-N-ethylbenzamide, N,N-bis(6-methylphenyl) propionamide, N,N-bis(3,5-dimethylphenyl) propionamide, and the like;

3. N-formylpiperidine, N-acetylpyrrolidine, N-propionylmorpholine, N-acetyl-4,5-dimethylpyrrolidine, N-butanoylpiperidine, N-acetyl-6-methylpiperidine, and the like; and 4. 1-methyl-2-pyrrolidone, 1-phenyl-2-pyrrolidone, 1-butyl-2-piperidone, 1-pentyl-2-piperidone, 1-(m-tolyl)-2-piperidone, 1-ethyl-2-piperidone, 1-(3,5-dimethylphenyl)-2-piperidone, 1-methyl-2-piperidone, 1-phenyl-2-piperidone, 1-propyl-2-piperidone, 1-isopropyl-2-pyrrolidone, 1-(3-methylphenyl)-2-pyrrolidone, N-methyl-2-homopiperidone, N-ethyl-2-homopiperidone. However, we especially prefer to use dimethylacetamide, dimethylformamide, or N-methyl-2-pyrrolidone in this heating step.

The acid compounds used for preparing the 3-hydroxy-3-methylcepham products of the process of this invention include sulfuric acid or sulfamic acid, and salts and esters of such acids. Examples of salts of these acids include the alkali metal salts, e.g., the lithium, sodium, potassium, and rubidium salts, although only the sodium and potassium salts are of practical economic significance. The magnesium and calcium salts of these acids may also be used but are not preferred. Partial and complete esters of these acids with $C_1$ to $C_6$-alkanols such as dimethylsulfate, diethylsulfate, dimethylsulfamate, dipropylsulfamate and the like can also be used. However, it is easier and more convenient to use the free acids in the reaction mixture.

The concentration of the sulfuric acid, sulfamic acid, or equivalent salts, or ester in the reaction mixture will vary depending upon the nature of the acid substance, the concentration of the penicillin or penam sulfoxide ester, the solvent system used, the desired time and temperature of reaction, and the like. In general, the molar ratio of penicillin sulfoxide to acid ranges from about 1:1 to about 50:1. Preferably a molar ratio of penicillin sulfoxide ester to acid ranges from about 5:1 to about 15:1. The concentration of the penicillin sulfoxide ester in the total solvent system can vary extensively but preferably constitutes from about 1 to about 20 percent by weight of the reaction mixture.

The penicillin or penam sulfoxide acid, salt, or ester in the acidified solvent system, is heated to from about 80° C. to about 150° C. to direct the rearrangement of the penicillin sulfoxide ester to the 3-hydroxy-3-methylcepham compound. In the preferred tertiary carboxamide containing solvents or solvent mixtures, the preferred heating temperature is from about 90° C. to about 130° C. for from about 2 to about 24 hours. Lower temperatures require more time, while at higher temperatures the reaction mixture tends to produce a more complex reaction product.

The 3-hydroxy-3-methylcepham ester products can be recovered from the reaction mixture by conventional methods. Usually the reaction mixture is concentrated under vacuum to remove most of the reaction mixture solvents therefrom. The residue is dissolved in a suitable organic solvent such as a chlorinated hydrocarbon solvent such as methylene chloride, chloroform, carbon tetrachloride, a $C_1$ to $C_6$-alkanol such as methanol, isopropanol, etc., or a hydrocarbon such as benzene, toluene, xylene, heptane, or the like, and extracted with dilute aqueous acids to remove residual tertiary carboxamide solvents. The organic solvent solution containing the product can be concentrated to obtain relatively pure product, sufficiently pure for further contemplated reactions, or further purified by conventional methods, e.g., re-crystallization.

Examples of compounds of this invention and the sulfoxides from which they can be obtained include the following:

tert-Butyl 3-hydroxy-3-methyl-7-(phenylacetamido)cepham-4-carboxylate from the tert butyl ester of phenylmethylpenicillin sulfoxide.

1,1-Dimethyl-2-propynyl 3-hydroxy-3-methyl 7-(4'-nitrophenylacetamido)cepham-4-carboxylate from the 1,1-dimethyl-2-propynyl ester of 4'-nitrophenylmethyl penicillin sulfoxide, 2,2,2-trichloroethyl 3-hydroxy-3-methyl-7-(octanoylamido)cepham-4-carboxylate from the 2,2,2-trichloroethyl ester of heptylpenicillin sulfoxide, 4-Nitrobenzyl 3-hydroxy-3-methyl-7-($\alpha,\alpha$-dimethylphenylacetamido)cepham-4-carboxylate from the 4-nitrobenzyl ester of $\alpha,\alpha$-dimethylphenylmethyl-penicillin sulfoxide, tert-Butyl 3-hydroxy-3-methyl-7-(5'-butoxycarbonylaminoadipoylamido)cepham-4-carboxylate from the tert-butyl ester of the N-butoxycarbonyl protected penicillin N sulfoxide, 3-Hydroxy-3-methyl-7-(phenoxyacetamido)cepham-4-carboxylic acid from phenoxymethyl penicillin sulfoxide, 3-Hydroxy-3-methyl-7-(2'-thienylacetamido)cepham-4-carboxylic acid from thienylmethylpenicillin sulfoxide.

Salts of such compounds are made by treating the acids with an appropriate base or basic salt such as sodium hydroxide, potassium hydroxide, sodium acetate, potassium hydroxide, potassium carbonate and the like to form the sodium or potassium salts, or with ammonium hydroxide or a trialkylamine such as trimethylamine or triethylamine to form the respective ammonium or amine salts.

The products of the process of this invention show some antibiotic activity against various Gram positive and Gram negative bacteria. They are of primary interest for use in preparing compounds having the $\Delta^3$-cephem cephalosporin nucleus. For example, stirring one of the 3-hydroxy-3-methyl-cepham compounds in a mixture of acetic anhydride and N,N-dimethylacetamide in an oil bath for approximately 15 minutes at about 100°–110° C. gives good yields of the corresponding 3-methyl-$\Delta^3$-cephem compound. For example, tert-butyl 3-hydroxy-3-methyl-7-(phenoxyacetamido)cepham-4-carboxylate will undergo an elimination reaction to form the corresponding ester, tert-butyl 3-methyl -7-(phenoxyacetamido)-$\Delta^3$-cephem-4-carboxylate, which is useful in the overall process of making the known cephalosporin antibiotic, cephalexin [7-D-($\alpha$-aminophenylacetamido)-3-methyl-$\Delta^3$-cephem-4-carboxylic acid] from phenoxymethyl penicillin. In such process, the phenoxyacetyl group is cleaved by treatment of the 3-methyl-$\Delta^3$-cephem ester with phosphorus pentachloride and pyridine, followed by treatment of the chlorinated product with methanol, and then with water to form the 7-amino-3 -methyl-$\Delta^3$-cephem nucleus ester which can be recovered conveniently, for example, as the p-tolenesulfonate salt, followed by reacylation of the nucleus ester with an activated or reactive form of an N-protected $\alpha$-aminophenylacetic acid, followed by removal of the N-protecting group and the ester group to obtain cephalexin.

The invention is further exemplified by the following detailed examples, in which all temperatures are in degrees centigrade.

EXAMPLE 1

4-Nitrobenzyl 3-hydroxy-3-methyl-7-(2'-phenoxyacetamido)cepham-4-carboxylate (II).

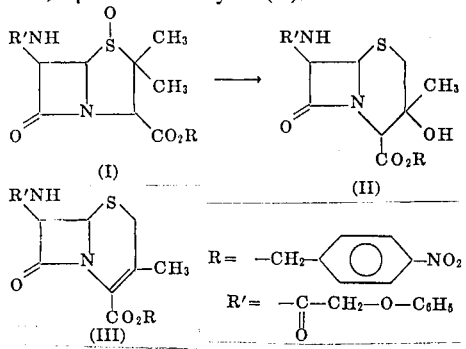

A solution of 500 mg. of penicillin-V-sulfoxide p-nitrobenzyl ester, 10 mg. p-toluene sulfonic acid monohydrate and 142 mg. dimethylacetylene dicarboxylate in 10 ml. N,N-dimethylacetamide were stirred in an oil bath at 110°–113° for 5 hours. The majority of solvents were removed in vacuo and the oily residue passed over 8 g. "Floricil," eluting with chloroform. The concentrated eluate was taken up in hot ethanol from which 90 mg. (17.2 percent) of 4-nitrophenyl 3-methyl 7-(2-phenoxyacetamido)-3-cephem-4-carboxylate (III) were deposited upon cooling, m.p. 190°–191°. Mother liquors were evaporated and the residue triturated with hot methyl isobutyl ketone to afford a white solid, recrystallization of which from hot acetonitrile yields 64 mg. (12.8 percent) of the title compound (II), m.p. 214°–215°.

During repetitions of this preparation yields of II varied between 10 and 22 percent.

The structure of compound II, 4-nitrobenzyl 3-hydroxy-3-methyl-7-(2'-phenoxyacetamido)cepham-4-carboxylate was further characterized by preparation by known methods of a. 3-hydroxy-3-methyl-7-(2'-phenoxyacetamido)cepham-4-carboxylic acid
b. methyl 3-hydroxy -7-(2'-phenoxyacetamido)cepham-4-carboxylate
c. 4-nitrobenzyl 3-(trimethylsilyloxy)-3-methyl -7-(2'-phenoxyacetamido)cepham-4-carboxylate
d. 4-nitrobenzyl 3-acetoxy-3-methyl-7-(2'-phenoxyacetamido)cepham-4-carboxylate
e. 4-nitrobenzyl 3-(trifluoroacetoxy)-3-methyl-7-(2'-phenoxyacetamido)cepham-4-carboxylate
f. 4-nitrobenzyl 3-hydroxy-3-methyl-7-(2'phenoxya cetamido)cepham-4-carboxylate-1-oxide
g. 4-nitrobenzyl 3-acetoxy-3-methyl-7-(2'phenoxya cetamido)cepham-4-carboxylate-1-oxide
h. 4-nitrobenzyl 3-acetoxy-3-methyl-7-(n-acetyl-2'-phenoxyacetamido)cepham-4-carboxylate-1-oxide
i. 4-nitrobenzyl 3-hydroxy-3-methyl-7-(2'-phenoxyacetamido)cepham-4-carboxylate-1,1-dioxide
j. 4-nitrobenzyl 3-acetoxy-3-methyl-7-(2'-phenoxyacetamido)cepham-4-carboxylate-1,1-dioxide Spectral data and elemental analyses were in agreement for the above named compounds, and this provided further evidence of the correctness of the named compound II, namely, 4-nitrobenzyl 3-hydroxy-3-methyl-7-(2'-phenoxyacetamido)cephem-4-carboxylate.

EXAMPLE 2

This example illustrates the utility of the new compounds as intermediates in the preparation of the corresponding 3-methyl-3-cephem compounds.

A suitable vessel containing a mixture of 100 mg. of 4-nitrobenzyl 3-hydroxy-3-methyl-7-(2'-phenoxyacetamido)cepham -4-carboxylate in 1 ml. of acetic anhydride and 0.2 ml. of N,N-dimethylacetamide (DMA) was immersed in an oil bath, and the mixture was stirred for approximately 15 minutes at 105° C. From this reaction mixture there is obtained 4-nitrobenzyl 3-methyl-7-(2'-phenoxyacetamido)-3-cephem-4-carboxylate, which upon ester group removal by known hydrogenation methods can be converted to 3-methyl-7-(2'-phenoxyacetamido)-3-cephem-4-carboxylate, a known antibiotic.

EXAMPLE 3

This example illustrates the direct preparation of the 3-hydroxy-3-methyl cepham compound in the acid form.

A solution containing 10.0 g. of penicillin V sulfoxide [2,2-dimethyl-6-phenoxyacetamido penam-3-carboxylic acid-1-oxide], 0.15 ml. of concentrated sulfuric acid, 100 ml. of benzene, and 75 ml. of N,N-dimethylacetamide was refluxed 14 hours. The dark red colored reaction mixture was then concentrated under vacuum and the residue was dissolved in 200 ml. of methylene chloride. After washing with dilute hydrochloric acid solution to remove residual N,N-dimethylacetamide, the methylene chloride solution was extracted with 5 percent disodium hydrogen orthophosphate in water solution. Acidification of the aqueous phase, extraction with chloroform, and concentration of the chloroform solution left 4.7 g. (47 percent yield) of the acid, 3-hydroxy-3-methyl-7-(phenoxyacetamido)cepham-4-carboxylic acid. An analytical sample was obtained by recrystallization from chloroform, m.p. 152°–153° C. The acid product was also characterized by infrared (IR), ultraviolet (UV), and nuclear magnetic resonance (NMR) spectra, elemental analysis, and non-aqueous titration.

EXAMPLE 4

A 10.0 g. portion of 4-nitrobenzyl penicillin V sulfoxide ester was added to 80 ml. of benzene and 60 ml. of DMA containing 2 drops of concentrated sulfuric acid. The solution was refluxed for 12 hours and then concentrated to a residue weight of 23.2 g. Addition of 100 ml. of isopropyl alcohol resulted in direct crystallization of substantially pure 4-nitrobenzyl 3-hydroxy-3-methyl-7-phenoxyacetamido-cepham-4-carboxylate. A purified sample of this product had a melting point of 212°–214° C. It was further characterized by IR, UV, NMR spectral analyses, as well as by elemental analysis and thin layer chromatographic (TLC) methods. All data were consistent with the assigned structure for the named compound.

EXAMPLE 5

The procedure of Example 4 was repeated but employing an equivalent amount of the dimethyl sulfate ester in place of sulfuric acid. The product, 4-nitrobenzyl 3-hydroxy-3-methyl-7-(phenoxyacetamido)cepham-4-carboxylate had a melting point of 208°–210° C.

EXAMPLE 6

A mixture of 10.0 g. of penicillin V sulfoxide, 4-nitrobenzyl ester, 0.194 g. of sulfamic acid in 112 ml. of benzene and 88 ml. of dimethylacetamide was stirred and refluxed 14 hours and then allowed to stand at room temperature for 3 hours. The solvents were removed under vacuum. The residue was triturated with xylene and re-concentrated under vacuum. The product was triturated with chloroform and the crystalline product was filtered. It weighed 3.91 g. (40.5 percent yield), m.p. 211°–212° C. with decomposition.

EXAMPLE 7

A mixture of 2.5 g. of 4-nitrobenzyl penicillin V sulfoxide ester, 0.07 g. of potassium bisulfate, in 28 ml. of benzene and 22 ml. of dimethylacetamide was refluxed until no starting material was present (about 18 hours). The mixture was concentrated in vacuo and re-concentrated after washing with xylene. The product 4-nitrobenzyl 3-hydroxy-3-methyl-7-(phenoxyacetamido)cepham-4-carboxylate, was crystallized after triturating with chloroform. The product weighed 1.02 g. (41 percent yield) m.p. 211°–213°C. A mixed melting point with a known sample of the same product was 211°–213°C.

EXAMPLE 8

The procedure of Example 4 is repeated using 2,2,2-trichloroethyl penicillin G sulfoxide ester in a mixture of benzene and dimethylacetamide containing concentrated sulfuric acid as the acidifying agent. After refluxing, and work-up of the reaction mixture there is obtained a product, 2,2,2-trichloroethyl 3-hydroxy-3-methyl-6-(phenylacetamido)cepham-4-carboxylate.

This ester is useful as our intermediate in the manufacture of desacetoxycephalosporin antibiotic substances, e.g., cephalexin.

EXAMPLE 9

The procedure of Example 4 is repeated except that tert-butyl 2,2-dimethyl-6-($\alpha,\alpha$-dimethyl-phenylacetamido)penam-3-carboxylate-1-oxide is used as starting material in place of the 4-nitrobenzyl penicillin V sulfoxide ester. There is obtained as product the tert-butyl 3-hydroxy-3-methyl-7-($\alpha,\alpha$-dimethylphenylacetamido)cepham-4-carboxylate.

This ester is useful as an intermediate in the production of desacetoxycephalosporin antibiotic substances.

EXAMPLE 10

The procedure of Example 4 is repeated except that 1,1-dimethyl-2-propynyl 2,2-dimethyl-6-(2'-thienylacetamido)penam-4-carboxylate-1-oxide is used in place of the penicillin V sulfoxide ester. There is obtained as product the 1,1-dimethyl-2-propynyl 3-hydroxy-3-methyl-7-(2'-thienylacetamido)cepham-4-carboxylate.

This ester is useful as an intermediate in the production of desacetoxycephalosporin antibiotic substances such as 3-methyl-7-(2'-thienylacetamido)-$\Delta^3$-cephem-4-carboxylic acid, a known antibiotic.

EXAMPLE 11

In a solution of dry benzene containing 28 millimoles of dry pyridine there are dissolved 7.8 millimoles of 4-methoxybenzyl 3-hydroxy-3-methyl-7-(phenoxyacetamido)cepham-4-carboxylate, which has been prepared by heating the 4-methoxybenzyl penicillin V sulfoxide ester in dimethylacetamide to 90°–110° C. for about 6 hours with sulfuric acid catalysis. The resulting solution is warmed to 50° to 60°C. and then while stirring 28 millimoles of phosphorus pentachloride are added at one time. The mixture is stirred at this temperature under a nitrogen atmosphere for about 1 hour. The resulting mixture is then cooled to 0° to 5°C. and treated with an excess of methanol. This methanol-treated mixture is stored for several hours at room temperature. After removing most of the benzene and methanol solvents by evaporation below 50°C. under reduced pressure, the residue (having a pH of about 1.8) is taken up in a 1:1 by volume mixture of water and tetrahydrofuran. After 2 hours, the tetrahydrofuran is removed and the aqueous residue is stirred with ethyl acetate and adjusted to pH 6.5–7 with 1 N aqueous sodium hydroxide. The ethyl acetate layer containing the crude 4-methoxybenzyl 3-hydroxy-3-methyl-7-aminocepham-4-carboxylate ester product is treated with about 8 millimoles p-toluene sulfonic acid to precipitate the p-methoxybenzyl 3-hydroxy-3-methyl-7-amino-cepham-4-carboxylate p-toluene sulfonate salt, which is separated from the reaction mixture by filtration. The separated salt can be stored in salt form or taken up in ethyl acetate/water mixture and adjusted to near pH 7 to separate the pure p-methoxybenzyl 3-hydroxy-3-methyl-7-amino cepham-4-carboxylate.

This ester product can be used as an intermediate, e.g., to prepare cephalexin by acylating the amino-ester with N-(tert-butoxycarbonyl) D-$\alpha$-phenylglycine in the mixed anhydride reaction, heating the acylated ester in N,N-dimethylacetamide containing acetic anhydride to about 105° C., and then treating the resulting product with anhydrous trifluoroacetic acid for 5 minutes to obtain 3-methyl-7-(D-$\alpha$-aminophenylacetamido)-$\Delta^3$-cephem-4-carboxylic acid (cephalexin). This antibiotic compound can be administered topically, parenterally, or as is preferred, orally in doses of from about 50 mg. to about 500 mg., from one to four times per day depending upon the disease condition being treated.

EXAMPLE 12

Following the procedure of Example 3, phenoxymethyl penicillin sulfoxide acid is mixed in N,N-dimethylacetamide and benzene solvent with an equivalent amount of sulfamic acid and heated for 14 hours. After concentration of the reaction mixture and purification according to the procedures described therein, there is obtained as product, 3-hydroxy-3-methyl-7-(phenoxy-acetamido)cepham-4-carboxylic acid.

We claim:

1. A process which comprises heating a penicillin sulfoxide acid or ester in the presence of sulfuric acid, sulfamic acid, an alkali metal salt or an ester of sulfuric or sulfamic acid with a $C_1$ to $C_6$-alkanol thereof, to from about 80° C. to about 150° C. in a reaction mixture containing at least about 10 percent by volume of a tertiary carboxamide, said tertiary carboxamide being further defined as having the formula

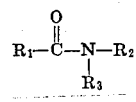

wherein

1. $R_1$ is hydrogen, and each of $R_2$ and $R_3$ alkyl, phenyl, tolyl, or xylyl such that $R_2$ and $R_3$ together contain up to about 14 carbon atoms;
2. at least one of $R_1$, $R_2$, and $R_3$ alkyl, and not more than two of $R_1$, $R_2$, and $R_3$ are phenyl, tolyl, xylyl, and $R_1$, $R_2$, and $R_3$ together contain up to about 18 carbon atoms;
3. $R_1$ is hydrogen or alkyl, $R_2$ and $R_3$ are taken together with the nitrogen to which they are bonded to form a saturated monocyclic ring which contains from four to six carbon atoms in the ring, which ring can also contain an oxygen ring member, gamma to the ring nitrogen, and $R_1$, $R_2$, and $R_3$ together contain not more than 12 carbon atoms; and/or
4. $R_1$ and $R_2$ are taken together with the amide grouping (—C(O)—N—) to which they are bonded to form a saturated carbonyl containing monocyclic ring having from four to six ring carbon atoms, $R_3$ is alkyl, phenyl, tolyl, or xylyl, and $R_1$, $R_2$, and $R_3$ together contain not more than 14 carbon atoms;

to form as product a 3-hydroxy-3-methylcepham-4-carboxylic acid or ester.

2. A process as defined in claim 1 wherein a penicillin sulfoxide ester is heated in the presence of sulfuric acid to from about 90° C. to about 120° C. in a reaction mixture containing a tertiary carboxamide wherein each of $R_1$, $R_2$, and $R_3$ is alkyl, such that $R_1$, $R_2$, and $R_3$ together contain up to about 18 carbon atoms.

3. A process as defined in claim 2 wherein a penicillin sulfoxide ester is heated in the presence of sulfuric acid in N,N-dimethylacetamide.

4. A process as defined in claim 2 wherein 4-nitrobenzyl phenoxymethylpenicillin sulfoxide ester is heated in the presence of sulfuric acid in a mixture of N,N-dimethylacetamide and benzene to form 4-nitrobenzyl 3-hydroxy-3-methyl 7-(phenoxyacetamido)cepham-4-carboxylate.

5. A process as defined in claim 1 wherein a penicillin sulfoxide acid is heated in the presence of sulfuric acid in a reaction mixture containing a tertiary carboxamide of the indicated formula wherein each of $R_1$, $R_2$, and $R_3$ is alkyl, such that $R_1$, $R_2$, and $R_3$ together contain up to about 18 carbon atoms.

6. A process as defined in claim 5 wherein phenoxymethyl penicillin sulfoxide acid is heated in the presence of sulfuric acid in N,N-dimethylacetamide.

7. A process as defined in claim 1 wherein a penicillin sulfoxide ester is heated in the presence of sulfamic acid to from about 90° C to about 120° C in a reaction mixture containing a tertiary carboxamide of the formula in claim 1 wherein each of $R_1$, $R_2$, and $R_3$ is alkyl, such that $R_1$, $R_2$, and $R_3$ together contain up to about 18 carbon atoms.

8. A process as defined in claim 7 wherein 4-nitrobenzyl phenoxymethyl penicillin sulfoxide ester is heated in the presence of sulfamic acid in solvent system containing N,N-dimethylacetamide.

9. A process as defined in claim 1 wherein a penicillin sulfoxide acid is heated in the presence of sulfamic acid in a solvent medium containing a tertiary carboxamide of the indicated formula wherein each of $R_1$, $R_2$, and $R_3$ is alkyl such that $R_1$, $R_2$, and $R_3$ together contain up to about 18 carbon atoms.

10. A process as defined in claim 8 wherein phenoxymethyl penicillin sulfoxide acid is heated in the presence of sulfamic acid in a solvent system containing N,N-dimethylacetamide.

* * * * *